United States Patent [19]

Koblanski

[11] Patent Number: 4,576,569

[45] Date of Patent: Mar. 18, 1986

[54] APPARATUS TO REMOVE OIL SLICKS

[75] Inventor: John N. Koblanski, Burnaby, Canada

[73] Assignee: Ocean Ecology Ltd., Vancouver, Canada

[21] Appl. No.: 676,373

[22] Filed: Nov. 29, 1984

[51] Int. Cl.[4] ............................................. F23C 11/04
[52] U.S. Cl. .......................................... 431/1; 431/2; 431/202; 210/222
[58] Field of Search ................ 431/1, 2, 75, 202; 210/922-924

[56] References Cited

U.S. PATENT DOCUMENTS 4,308,006  12/1981  Koblanski ............................... 431/2

Primary Examiner—Carroll B. Dority, Jr.
Attorney, Agent, or Firm—Townsend and Townsend

[57] ABSTRACT

Apparatus to burn a combustible pollutant floating on the surface of a body of water. The apparatus has a first body and buoyancy means to maintain the first body beneath the surface of the water. A first chamber is formed in the first body. A resonation chamber is fixed relative to the surface of the first body and above the first chamber and positioned to be above the surface of the water when the apparatus is in use. A high velocity fluid can be projected up from the first body to the resonation chamber to develop a shock wave that is directed back towards the pollutant to atomize the pollutant. The atomized pollutant can then be burned.

25 Claims, 8 Drawing Figures

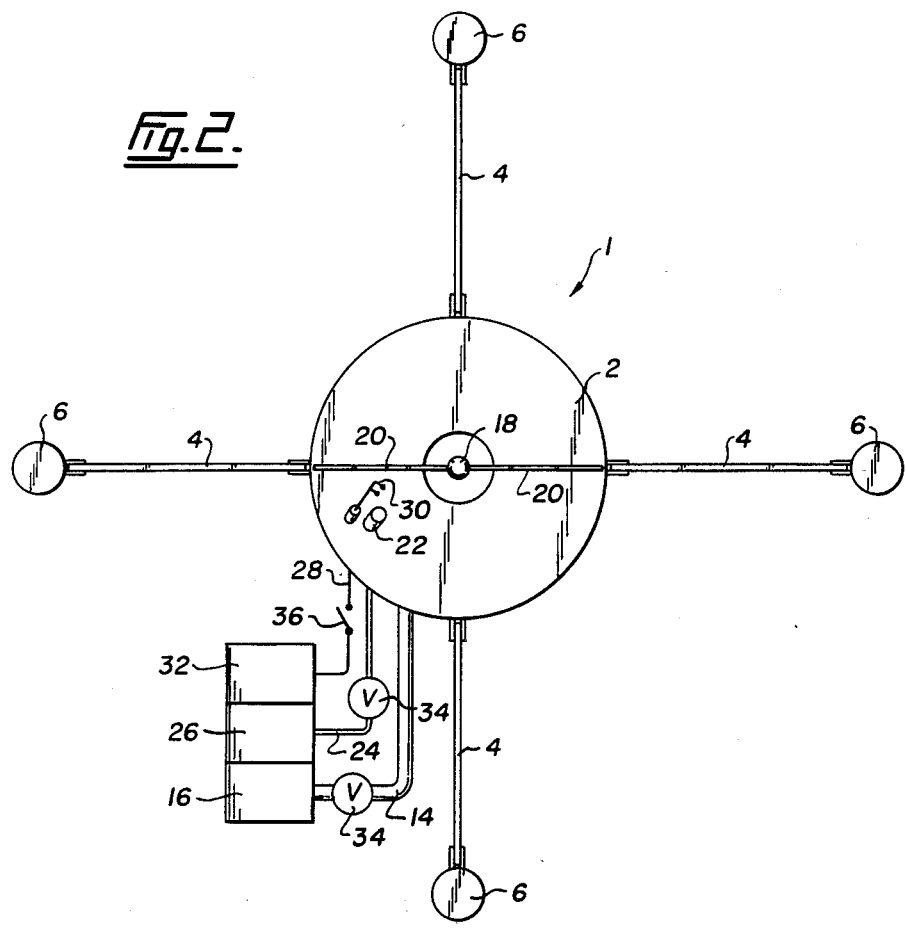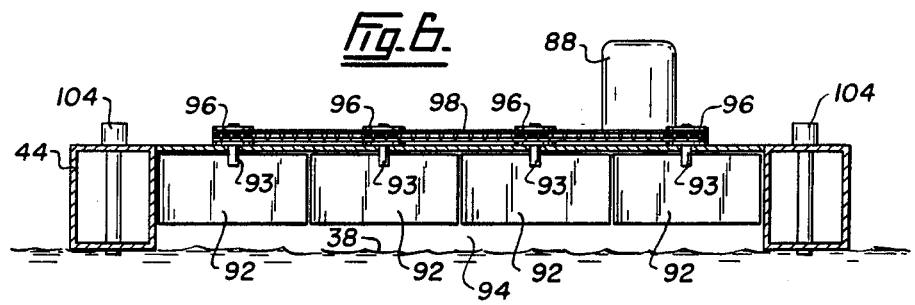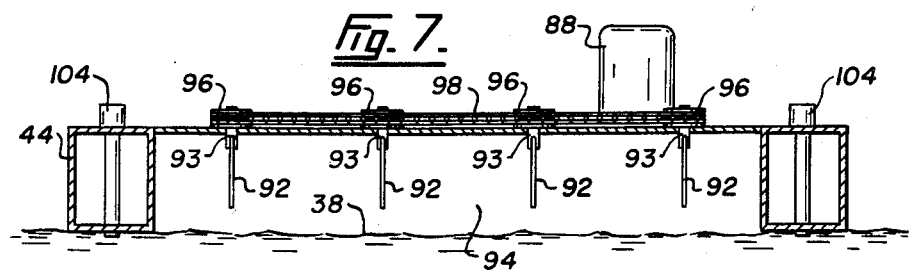

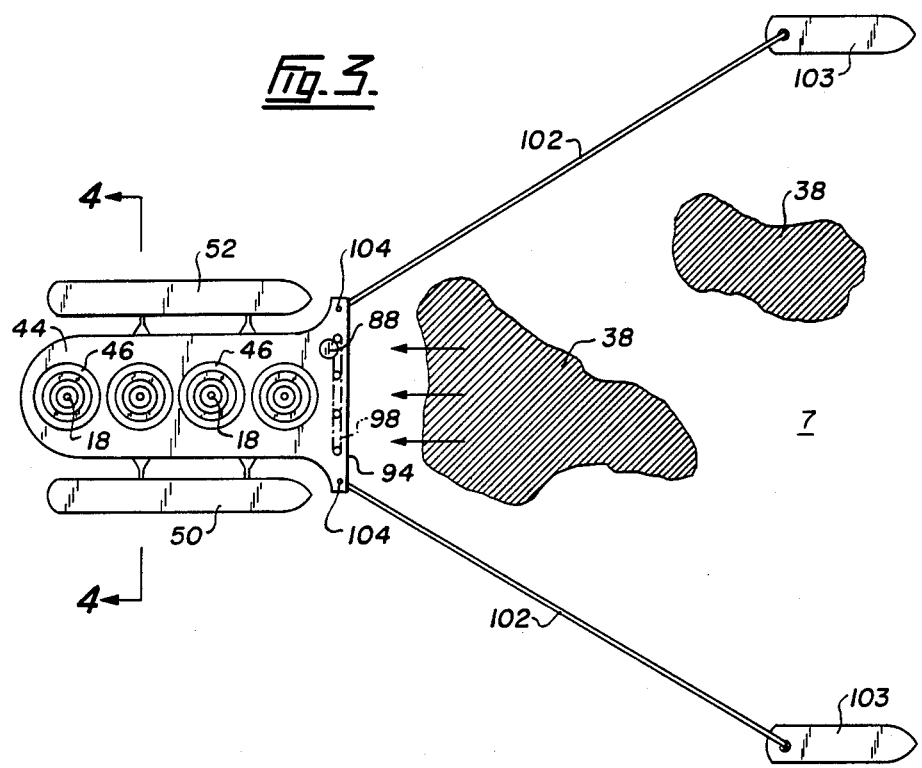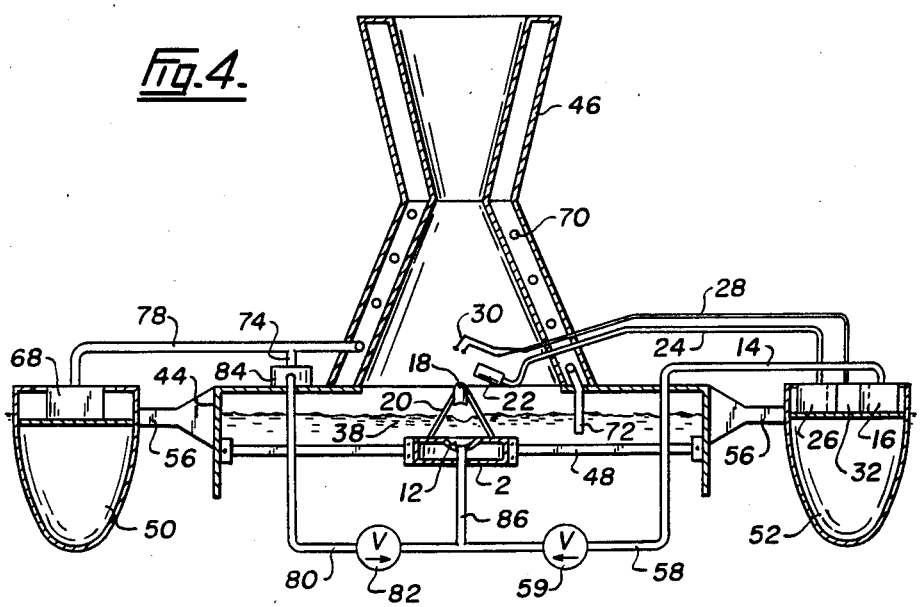

APPARATUS TO REMOVE OIL SLICKS

FIELD OF THE INVENTION

This invention relates to an apparatus for burning oil slicks or other combustible materials polluting a body of water. More specifically the invention relates to an apparatus that employs an acoustic energy-producing transducer to atomize the oil into a fine spray which can be readily combusted with the aid of a burner.

DESCRIPTION OF THE PRIOR ART

Prior art devices using acoustic energy to atomize and combust films of oil and the like pollutants floating on the surface of water employ transducers aimed at the water surface from under the water. This general configuration severely limits the type of transducer that can be used to either a ceramic or magnetostrictive type. These devices sometimes use amplifiers that are not readily available and are consequently costly. Still another device employs suction lines and pumps to deliver oil to the transducer and lines and pumps of this nature are prone to clogging. Suction lines necessitate critical height adjustments with respect to the water surface. Malfunctioning can occur as a result of water, debris or too viscous an oil entering the suction line. It will thus be apparent that the prior art is inherently complex and costly and that it is best operated only by trained personnel.

SUMMARY OF THE INVENTION

In contrast the present invention seeks to provide an apparatus that uses acoustic energy to atomize an oil slick so that it is readily combustible but without the disadvantages associated with the prior art devices. The device of the present invention employs a transducer located above the water surface that can be any one of many well known types currently available. The present invention does not employ amplifiers or suction lines or pumps and is therefore less complex and costly than the prior art and may be easily and cheaply constructed. Indeed in the simplest embodiment of the invention the device may be disposable, that is it may be thrown away after one use, thus eliminating the need for exotic, corrosion preventing materials. It follows that the present invention is both easy to operate and service, requiring no skilled personnel.

The present invention has the added advantage of being self-feeding to the water surface and having means for heat retention so as to improve oil surface flow. In one embodiment of the invention the device is self-contained having no outside supply lines. This makes deployment of the device much simpler in rough seas.

Accordingly the present invention provides an apparatus to burn a combustible pollutant floating on the surface of a body of water the apparatus comprising a first body; buoyancy means to maintain the first body beneath the surface of the water; a first chamber in the first body; a resonation chamber above the surface of the body of water, fixed relative to the surface of the first body and above the first chamber and positioned to be above the surface of the water when the apparatus is in use; means to project the high velocity liquid up from the first body to the resonation chamber to develop a shock wave that is directed back towards the pollutant to atomize the pollutant; and means to combust the atomizer pollutant.

DRAWINGS

Aspects of the invention are illustrated, merely by way of example, in the accompanying drawings in which:

FIG. 2 is a plan view of the embodiment of FIG. 1;

FIG. 3 is a plan view of a further embodiment according to the present invention in use;

FIG. 4 is a section on the line 4—4 in FIG. 3, on an enlarged scale;

FIGS. 6 and 7 are side elevations of a device according to the present invention.

DESCRIPTION OF THE PREFERRED EMBODIMENTS

Figure 1:
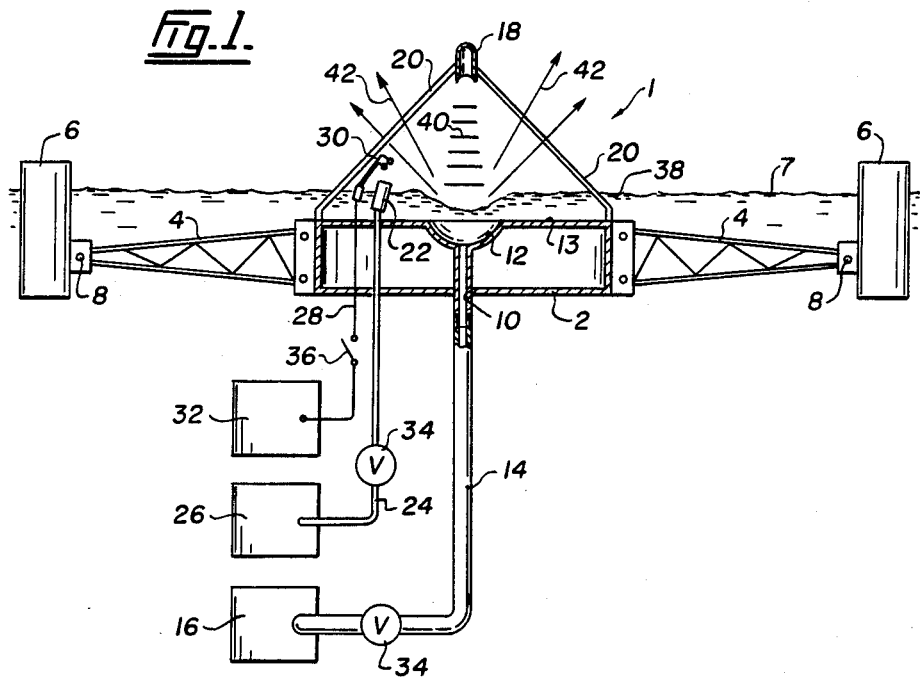
FIG. 1 is a side elevation of an embodiment of the present invention.
Figure 1A:
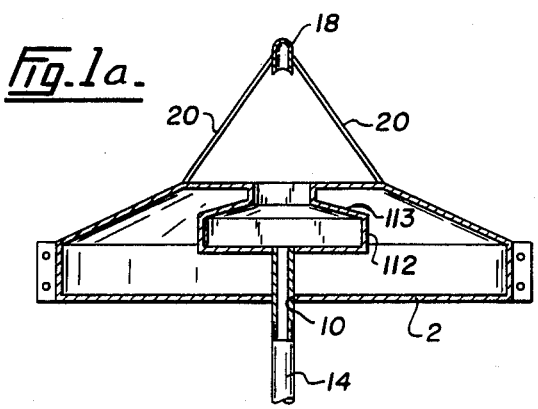
FIG. 1a illustrates a detail of a variation of the embodiment of FIG. 1.
Figure 5:
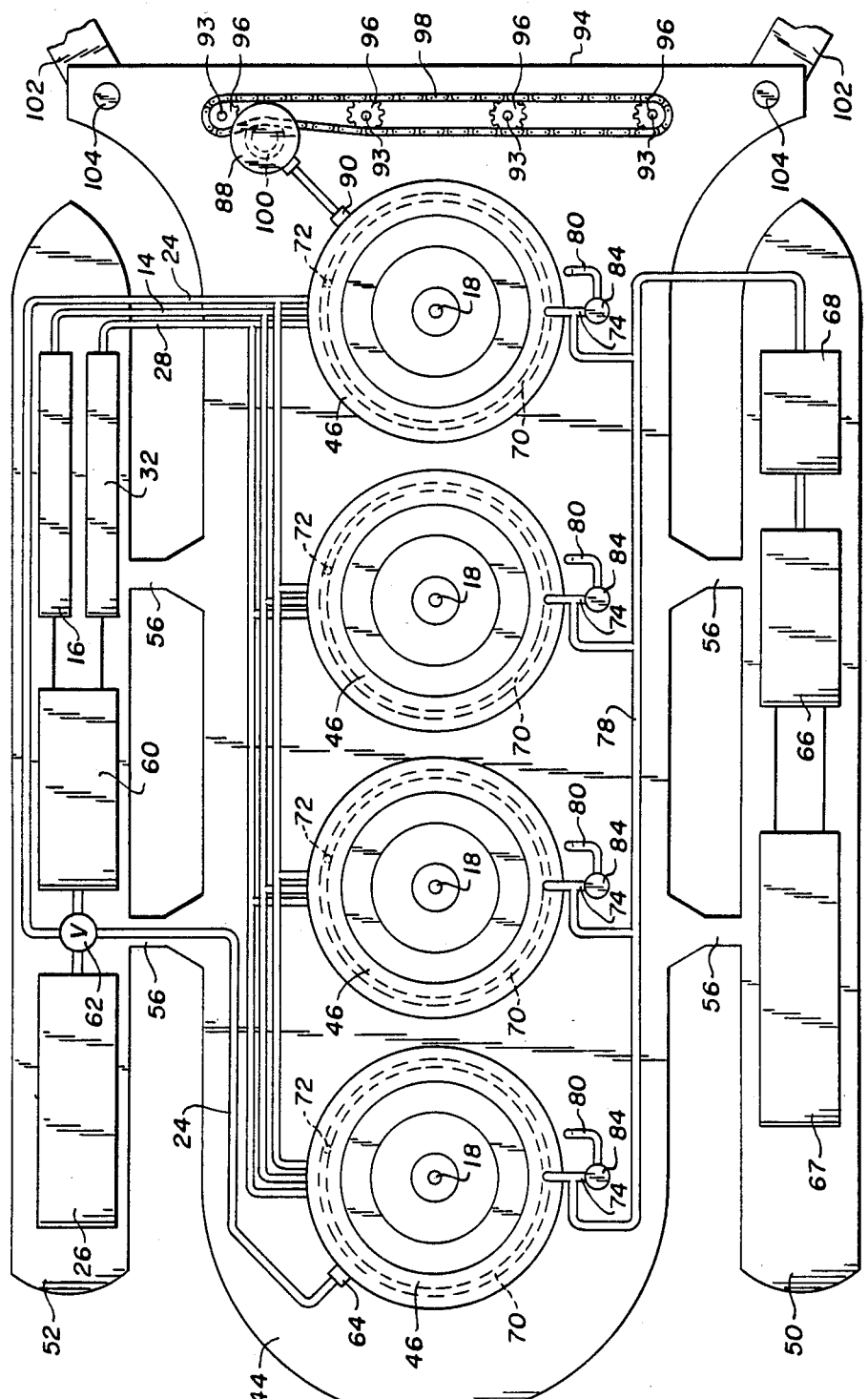
FIG. 5 is a detailed plan view of the embodiment of FIG. 3.

FIGS. 1, 1a and 2 show a device 1 having a cylindrical body 2 to which a plurality of struts 4 are secured. The struts 4 are rigidly fixed at spaced intervals around the entire periphery of body 2 and periphery 4, as best shown in FIG. 2. Floats 6 are in turn pivotally secured to the end of each strut 4 by pins 8 and thus enable the body 2 and accompanying components to be buoyant. The buoyancy of the floats 6 is such that the body 2 is suspended just below the surface of the water 7—see FIG. 1. The body 2 has an aperture 10 formed through its middle that terminates in a depression 12 on upper surface 13 of the body—see FIG. 1. In FIG. 1a the variation shown is the replacement of depression 12 with a rectangular section chamber 112 having sloped upper surfaces 113. As discussed below the dimensions of the depression 12 may be varied so as to effect the operation of the device.

A flexible conduit 14 communicates with the depression 12 through aperture 10 and allows compressed air or steam to travel from source 16 through the body 2. An inverted, cup shaped resonation chamber 18 is positioned directly above aperture 10 and depression 12 by angled, supporting struts 20 and receives the compressed air or steam. A propane torch 22 admits propane to the region directly beneath resonation chamber 18 and is supplied by flexible conduit 24. Conduit 24 connects torch 22 with propane source 26. An insulated, high voltage electric line 28 provides current to ignitor 30 situated near propane torch 22. The ignitor 30 is employed to start combustion of the propane issuing from torch 22. Line 28 is connected to a high voltage electric supply 32.

Compressed air or steam source 16, propane source 26 and electrical supply 32 are preferably anchored on a barge or the like some distance away from the device. However they communicate with the device through conduits 14 and 24 and line 28 respectively. Suitable valves 34 are provided in conduits 14 and 24 so that the flow of gas may be easily controlled. A switch 36 controls the flow of electric current.

The device 1 operates in the following manner. The device 1 is towed by suitable means to the location of an oil slick 38 and anchored in position in conventional manner. Valve 34 that controls the flow of propane is opened so that the gas is conducted through conduit 24 towards torch 22. The electrical circuit is then completed by switch 36 so that the ignitor 30 produces sparks sufficient to initiate combustion of the propane gas. Once combustion is underway compressed air is admitted into body 2 by conduit 14. Once the compressed air has passed through the body 2 it penetrates the surface of the water 7 and is received in resonation chamber 18. The resonation chamber 18 reverses the flow of the compressed air and in the process creates diverging shock waves 40. Shock waves encounter the surface of the water 7 and the oil slick 38 is simultaneously sheared and atomized with the resultant spray 42 of oil particles being sprayed upwardly into the region in which the combustion of the propane is occurring. As the oil particles are atomized they are readily combusted with the propane. It should be noted that as the oil is atomized a reaction draws the surface oil into the centre of the body 2, thus ensuring the device is continuously supplied with a layer of fresh oil to burn.

It should be noted that the control and direction and amount of oil that is atomized may be controlled by altering the dimensions of depression 12 in body 2 in which the reflected shock waves 40 are received. For example it has been determined that a deep, narrow depression 12 will result in a beam of oil particles that is narrow and has an almost vertical trajectory. A wide shallow depression 12 will result in a spray of oil particles that is wide and has a more horizontal trajectory 42. The latter shape is preferred when radiation is needed to heat the oil to improve its fluidity, for example in cold climates. Both shapes of the depression 12 will of course work in all circumstances. The embodiment of FIG. 1a has been found to be more efficient than the simple depression shown in FIG. 1.

FIGS. 3 through 7 show an alternative embodiment of the invention in which a plurality of the devices 1 shown in FIG. 1 are housed under a common hood 44. The hood 44 has a corresponding number of double wall stacks 46 formed in it, each positioned directly over a resonation chamber 18 and shaped as a venturi. The main body 2 of each device 1 in this embodiment is supported by struts 48 that connect directly to the hood 44. The hood 44 is equipped with floats 50 and 52, the floats being attached to the outer edges of hood 44 by struts 56. The hood 44 and components secured to are therefore buoyant.

The compressed air source 16, high voltage electrical supply 32 and propane source 26 of the previous embodiment are housed within float 52. The source of compressed air 16, which preferably comprises a conventional compressor, is driven by a conventional small capacity internal combustion engine 60. The compressed air so created is admitted to body 2 of the device 1 via conduit 58 and conduit 86. A one way valve 59 ensures the flow is unidirectional. The engine 60 may also power a conventional electric generator that produces high voltage electric supply 32. The charge is conducted to each stack 46, again by line 28 and to ignitor 30.

The propane source 26, while also feeding propane to each nozzle 22 directly via conduit 24, as in the previous embodiment, is also used as a fuel supply for engine 60. A valve 62 regulates the amount of propane used by engine 60. The position of valve 62 is controlled by a conventional thermostat 64 secured to a wall of one stack 46.

Within float 50 is a second electric generator 66 powered by a steam turbine 68. The turbine 68 is in turn powered by steam generated from the evaporation of sea water travelling in coils 70 surrounding each stack 46. Sea water is transferred to coil 70 through intake nozzle 72. The coil 70 branches at the base of each stack 46 so as to join and feed turbine 68 through a common conduit 78 and also to provide steam to each transducer body 2 via individual conduits 80. A one way valve 82 in conduit 80 guards against reverse flow of gases and a pressure regulator 84 in conduit 80 ensures that the steam is admitted to body 2 in the correct amounts.

Electrical generator 66 in float 50 provides power to a small electric motor 88 when required. The distribution of current generated by generator 66 is by distributor 67. Motor 88 is turned on or off by thermostat 90. Motor 88 controls the movement of a draught assembly that admits fresh air under hood 44. A plurality of rectangular doors 92—see FIG. 6—are pivotally mounted by means of shafts 93 in the mouth 94 of hood 44. Gears 96 are mounted atop each shaft 93 and engage an endless chain 98 powered by motor 88 through drive gear 100.

A pair of fireproof booms 102 are used to attach the entire apparatus to tugs 103. The booms 102 are located on hood 44 by pins 104.

This embodiment of the invention works as follows:

After being towed to the location of an oil slick the engine 60 is started. The engine draws its fuel from propane supply 26. Simultaneously a quantity of propane is diverted to nozzle 22 located within stacks 46. The engine 60 powers the electrical generator 32 which supplies high voltage electricity through line 28 to ignitors 30 to cause combustion of the propane confined within the stacks 46. Compressed air source 16 provides a flow of compressed air to body 2 of each device 1 through conduits 14 and 58 and branch conduit 86. As before the device creates a shock wave that atomizes the oil and sprays it upwardly where it is combusted with the propane and exhausted. As the under hood temperature rises, sea water is drawn up through intake 72 and around stack 46 by coils 70 where it is vaporized. Most of the steam formed is then conducted to turbine 68 by conduit 78. A portion of the steam is diverted at branch 74 and funnelled through conduit 80 and branch conduit 86 to the device 1. At this point the temperature is sufficiently high to cause thermostat 64 to close valve 62 which, in turn, shuts off the fuel supply to engine 60. Compressed air from source 16 is therefore halted as is the supply of electric current by generator 32. The transducer is now operated on the steam formed in coil 70 rather than the compressed air. As combustion is already occurring within stacks 46 there is no longer any need for high voltage current to be supplied to ignitors 30.

Power is still provided to the motor 88 by generator 66 driven by turbine 68. The motor 88, is not, however, operated until stack 46 temperature has reached a high enough level to activate thermostat 90. When this occurs motor 88 causes rectangular doors 92 to pivot about shafts 93 to admit fresh air under hood 44. This aids in cooling the apparatus and reduces the thermal stress on booms 102.

Thus the apparatus of the invention is simple to make and use, is efficient in its ability to remove pollutants and is efficient in its use of energy, largely because the heat used to combat the pollutant can be used as the energy source to operate the device for a substantial amount of its operating time.

I claim:

1. Apparatus to burn a combustible pollutant floating on the surface of a body of water the apparatus comprising:
   a first body;
   buoyancy means to maintain the first body beneath the surface of the water;
   a first chamber in the first body;
   a resonation chamber, fixed relative to the surface of the first body and above the first chamber and positioned to be above the surface of the water when the apparatus is in use;
   means to project a high velocity fluid up from the first body and through said chamber to the resonation chamber to develop a shock wave that is directed back towards the pollutant to atomize the pollutant; and
   means to combust the atomized pollutant.

2. Apparatus as claimed in claim 1 in which the first body comprises a chamber having a passageway through it as a means to project the high velocity fluid.

3. Apparatus as claimed in claim 1 in which the buoyancy means comprise floats mounted on booms attached to the first body.

4. Apparatus as claimed in claim 1 in which the first chamber is a recess formed in the upper surface of the first body.

5. Apparatus as claimed in claim 1 in which the first chamber is a subchamber within the first body.

6. Apparatus as claimed in claim 5 in which the subchamber has an upper surface sloping downwardly outwardly from its centre.

7. Apparatus as claimed in claim 1 in which the resonation chamber is mounted on struts extending upwardly from the first body.

8. Apparatus as claimed in claim 1 in which the means to project the high velocity fluid is a source of compressed air.

9. Apparatus as claimed in claim 1 in which the means to project the high velocity fluid is a source of steam.

10. Apparatus as claimed in claim 1 including valve means to control flow of the fluid.

11. Apparatus as claimed in claim 1 in which the means to combust the atomized pollutant is a source of combustible gas.

12. Apparatus as claimed in claim 11 in which the combustible gas is propane.

13. Apparatus as claimed in claim 11 including ignition means for the gas.

14. Apparatus as claimed in claim 13 in which the ignition means comprises spaced electrodes with high voltage means to form a spark between the electrodes.

15. Apparatus as claimed in claim 1 having a plurality of first bodies in one apparatus.

16. Apparatus as claimed in claim 15 in which the bodies are mounted beneath a hood.

17. Apparatus as claimed in claim 16 including stacks for combusted gases over each first body.

18. Apparatus as claimed in claim 15 in which the apparatus includes an engine to drive a compressor to compress air and to drive a generator to develop the voltage needed to induce a spark.

19. Apparatus as claimed in claim 18 in which propane used to combust the atomized pollutant is also used to run the engine.

20. Apparatus as claimed in claim 17 in which the stacks include heating coils whereby water may be heated to generate steam as the high velocity fluid.

21. Apparatus as claimed in claim 20 including pressure regulators to control steam flow from the first body.

22. Apparatus as claimed in claim 16 including doors to regulate air supply beneath the hood.

23. Apparatus as claimed in claim 22 in which means including an electrical motor is used to move the doors.

24. Apparatus as claimed in claim 23 in which the motor is controlled thermostatically by a thermostat that senses stack temperature, the thermostat acting to open the doors when the temperature reaches a predetermined level.

25. Apparatus as claimed in claim 20 in which the apparatus includes a turbine and a portion of the steam is directed to the turbine to drive it.

* * * * *